United States Patent [19]

Ishi et al.

[11] Patent Number: 4,688,217
[45] Date of Patent: Aug. 18, 1987

[54] METHOD OF IMPLEMENTING BURST ACQUISITION CONTROL IN TDMA SYSTEM

[75] Inventors: Yuuhei Ishi; Hideki Nakamura, both of Tokyo, Japan

[73] Assignee: NEC Corporation, Japan

[21] Appl. No.: 770,639

[22] Filed: Aug. 28, 1985

[30] Foreign Application Priority Data

Aug. 31, 1984 [JP] Japan .................................. 59-182339
Aug. 31, 1984 [JP] Japan .................................. 59-182340

[51] Int. Cl.$^4$ ............................................. H04J 3/06
[52] U.S. Cl. .................................... 370/104; 370/103; 375/111
[58] Field of Search ...................... 370/104, 100, 103; 375/111, 107; 455/12, 13

[56] References Cited

U.S. PATENT DOCUMENTS

| | | | |
|---|---|---|---|
| 3,813,496 | 5/1974 | Maillet | 370/104 |
| 4,252,999 | 2/1981 | Acampora et al. | 370/104 |
| 4,346,470 | 8/1982 | Alvarez, III | 370/104 |
| 4,602,375 | 7/1986 | Inukai | 370/104 |

Primary Examiner—Robert L. Griffin
Assistant Examiner—Wellington Chin
Attorney, Agent, or Firm—Laff, Whitesel, Conte & Saret

[57] ABSTRACT

In order to implement burst acquisition control of reference stations over a traffic terminal(s) in the TDMA system, the reference station opens a synchronization window at the nominal position of the traffic terminal. The reference station checks to determine if a burst transmitted from the traffic terminal is detected within said synchronization window. If the burst is detected within said synchronization window, then the burst acquisition control is omitted. Otherwise, the burst acquisition control is implemented.

4 Claims, 4 Drawing Figures

METHOD OF IMPLEMENTING BURST ACQUISITION CONTROL IN TDMA SYSTEM

BACKGROUND OF THE INVENTION

1. Field of The Invention

This invention relates to a method of controlling a traffic terminal(s) in a TDMA (Time Division Multiple Access) satellite communications system, and more specifically to such a method which is suited for use with systems wherein more than two reference stations are available for traffic control.

2. Description of the Prior Art

In the TDMA system, each earth station (viz., reference station or traffic terminal) is allowed to transmit bursts (viz., high speed transmission of data bits) in a manner that each burst is located within an allocated time slot of each consecutive TDMA frame. The burst, therefore, has the same period as the TDMA frame and hence plays a vital role in TDMA system synchronization control.

When initially establishing communications between earth stations, burst transmit timing is unknown to a controlled earth station and hence burst acquisition support is necessary prior to the burst synchronization control. Viz., when a reference station intends to initially control a traffic terminal or terminals, the reference station is first required to perform the burst acquisition control with the traffic terminal(s) to be controlled.

More specifically, in such an initial stage between the earth stations, the reference station initially transmits acquisition control information to the controlled terminal, and opens a wide window at a burst acquisition control position (viz., acquisition window) in order to detect the burst which is to be transmitted from the traffic terminal in response to the control information contained in a reference burst. When the burst is received within the acquisition window, the reference station acquires same, measures the received burst position and thereafter computes the difference between the actually received burst position and the nominal position of the traffic terminal. Subsequently, the reference station transmits burst shift information based on the measured position difference.

Thereafter, the reference station closes the above-mentioned window and opens a new window (viz., synchronization window) at the nominal position of the traffic terminal in order to receive a burst which is to transmitted from the controlled (i.e., traffic) terminal If the reference station receives the burst within the new window, it terminates the burst acquisition control to start the next control, viz., synchronization control.

In the case where a single reference station controls one or more traffic terminals, the above-mentioned burst acquisition control does not encounter any problems.

However, in the case where more than two reference stations control the same traffic terminal(s), the above-mentioned system encounters a drawback if there exists a difference between the nominal and acquisition positions of the traffic terminal. FIG. 1 shows a format of an example of the nominal positions of the two (first and second) reference stations and traffic terminal together with the decision (synchronization and acquisition) windows.

More specifically with the above-mentioned drawback, it is practically impossible for the plurality of reference stations to simultaneously control the same traffic terminal(s). Consequently, when a first reference station has completed the burst acquisition control with the traffic terminal(s), the second or later coming reference station is no longer able to receive, at its burst acquisition window, the burst transmitted from the traffic terminal to be controlled. This is because the traffic terminal(s), already controlled by the first reference station, has transmitted its burst at the nominal position thereof. This indicates that the later coming reference station continues (ties up) to transmit the acquisition control information to the traffic terminal(s) while opening the acquisition window and hence is unable to shift the control thereof to the synchronization support.

For further information of the TDMA system, reference should be had to "INTELSAT, TDMA REFERENCE STATION EQUIPMENT SPEC. (Intel 196).

SUMMARY OF THE INVENTION

It is therefore an object of this invention to provide a method of performing burst acquisition in the case where at least two reference stations control one or more traffic terminals.

A first aspect of this invention takes the form of a method of implementing burst acquisition control of reference stations over at least one traffic terminal in the Time Division Multiple Access system, comprising the steps of: (a) allowing the reference station to open a synchronization window at the nominal position of the traffic terminal; (b) checking to determine if a burst transmitted from the traffic terminal is detected within the synchronization window; (c) omitting the burst acquisition control if the burst is detected within the synchronization window; and (d) implementing the burst acquisition control in the event that the burst is not detected within the synchronization window.

A second aspect of this invention takes the form of a method of implementing burst acquisition control of reference stations over at least one traffic terminal in the Time Division Multiple Access system, comprising the steps of: (a) setting a timer counting over a predetermined time period; (b) allowing the reference station to transmit acquisition control information to the traffic terminal, the traffic terminal transmitting a burst in response to the acquisition control information; (c) checking to determine if the predetermined time period has expired; (d) in the event that the predetermined time period has not expired, allowing the reference station to open an acquisition window at an acquisition control position, and checking to determine if a first burst is detected within the acquisition window; (e) in the event that the first burst is not detected within the acquisition window, going back to step (b), and in the event that the first burst is detected allowing the reference station to implement the burst acquisition control; (f) in the event that the predetermined time period has expired, allowing the reference terminal to open a synchronization window at the nominal position of the traffic terminal; (g) checking to determine if a second burst is detected within the synchronization window; (h) in the event that the second burst is detected within the synchronization window, omitting the burst acquisition control; and (i) in the event that the second burst is not detected, going back to step (a) after resetting the timer.

BRIEF DESCRIPTION OF THE DRAWINGS

The features and advantages of the present invention will become more clearly appreciated from the following description taken in conjunction with the accompanying drawings in which like blocks, circuits or circuit elements are denoted by like reference numerals and in which.

DETAILED DESCRIPTION OF THE PREFERRED EMBODIMENTS

Figure 1:
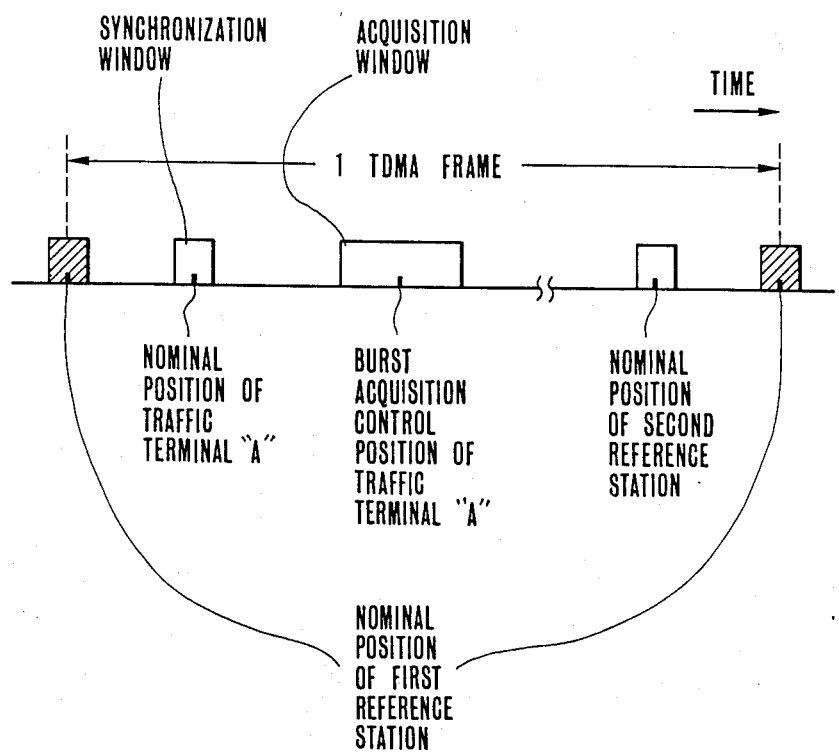
FIG. 1 is a format showing an example of a TDMA frame.
Figure 2:
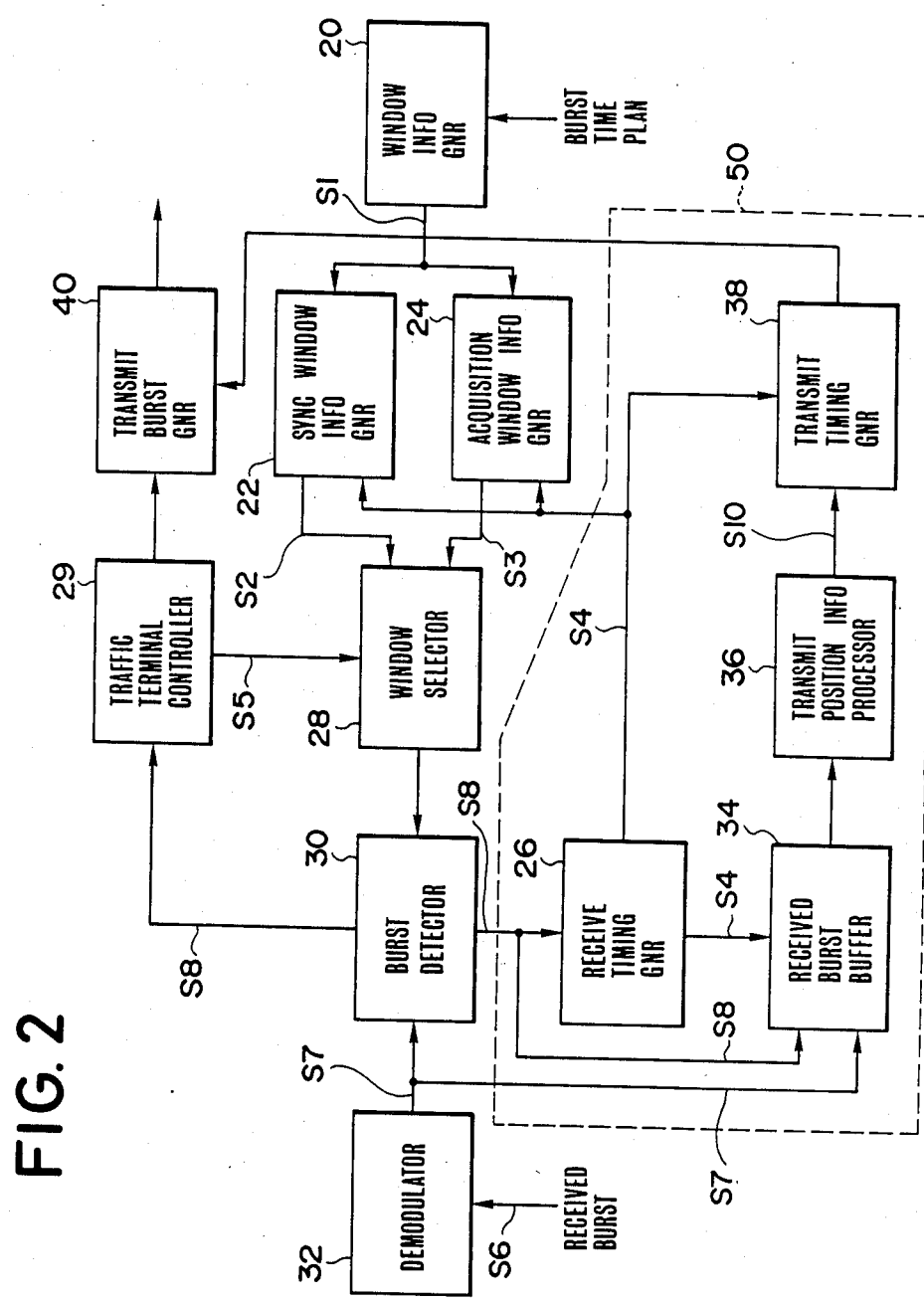
FIG. 2 is a block diagram of a portion of a reference station used to execute this invention.

Reference is now made to FIG. 2. A window information generator 20 is supplied with Burst Time Plan and produces appropriate window information S1 which is applied to a synchronization window generator 22 and also to an acquisition window generator 24. The generator 22 produces a synchronization window information S2 in synchronism with receive frame timing information S4 which is applied from a receive timing generator 26. Similarly, the generator 24 produces acquisition window information S3 in synchronism with the receive frame timing information S4. A window selector 28 is supplied with the two kinds of window information from the generators 22 and 24, and selects one of the same in response to window control information S5 from a traffic terminal controller 29. The selected window information is fed to a burst detector 30.

A demodulator 32 demodulates received IF (Intermediate Frequency) bursts S6 into corresponding digital baseband signals S7. The baseband signals S7 are applied to the burst detector 30 and to a received burst buffer 34.

The burst detector 30 detects a burst within the selected window, and outputs burst-detection information S8 which is applied to the three blocks: viz., the traffic terminal controller 29, the receive timing generator 26 and the received burst buffer 34. The receive timing generator 26 outputs the receive frame timing information S4 according to the reference burst of the burst-detection information S8. The buffer 34 reproduces data from the received bursts S7 according to the burst-detection information S8 as well as the receive frame timing information S4, and stores the data. The stored data is applied to a transmit position information processor 36, which decodes a transmit delay (Dn) to produce transmit position information S10. This information S10 is applied to a transmit timing generator 38 from which a transmit frame timing information S11 is generated under the control of the receive frame timing information S4. The transmit frame timing information S11 is then fed to a transmit burst generator 40 in order to control the transmit timing.

In FIG. 2, the reference numeral 50 represents the section which generates the receive and transmit timings and which is not directly concerned with this invention.

Figure 3:
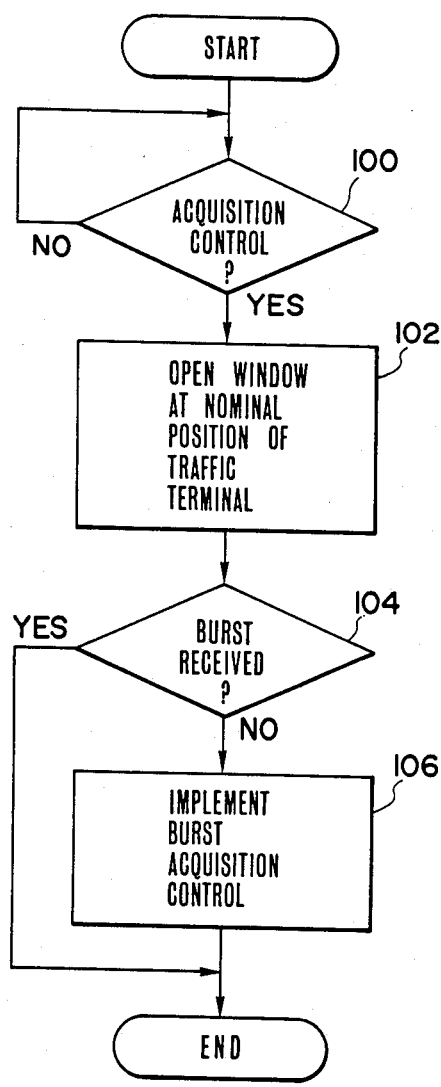
FIGS. 3 and 4 are flow charts depicting the steps which characterize first and second embodiments of this invention.

This invention will be discussed in more detail with reference to FIGS. 2 and 3. FIG. 3 is a flow chart showing the control steps which characterize a first embodiment of this invention.

In the event that one of the reference stations intends to control a traffic terminal(s), the acquisition control is initiated (Step 100). The controller 29 instructs the window selector 28 to select the synchronization window. Thus, the burst detection window opens at the nominal position of the traffic terminal to be controlled (Step 102).

If the burst is detected within the synchronization window at Step 104, this indicates that the other reference station has already completed the acquisition support of the traffic terminal. Therefore, the acquisition control is omitted.

On the other hand, if the burst detector 30 fails to detect the burst within the synchronization window (Step 104), this indicates that the other reference station has not yet completed the acquisition control in connection with the traffic terminal in question. Therefore the acquisition control is needed at Step 106.

At Step 106, the traffic terminal controller 29 instructs the transmit burst generator 40 to emit the acquisition control information therefrom in order to have the traffic terminal transmit a burst for acquisition control. At the same time, the controller 29 instructs the window selector 28 to apply the acquisition window information to the burst detector 30. Thus, the acquisition window of relatively large width opens at the acquisition control position. If the burst detector 30 detects the burst from the traffic terminal within the acquisition window, then the traffic terminal controller 29 responds to the output S8 of the detector 30. On the other hand, the controller 29 measures the position of the burst which has been received within the acquisition window, and computes the difference between the actually received burst position and the nominal position of the traffic terminal. Subsequently, the controller 29 instructs the transmit burst generator 40 to emit the control information based on the measured position difference. The traffic terminal shifts the burst to the nominal position thereof in response to the control information from the reference station. Thereafter, the synchronization window is opened at the nominal position of the traffic terminal. If the burst from the traffic terminal is detected within the synchronization window (Step 106), the acquisition control is terminated.

Figure 4:
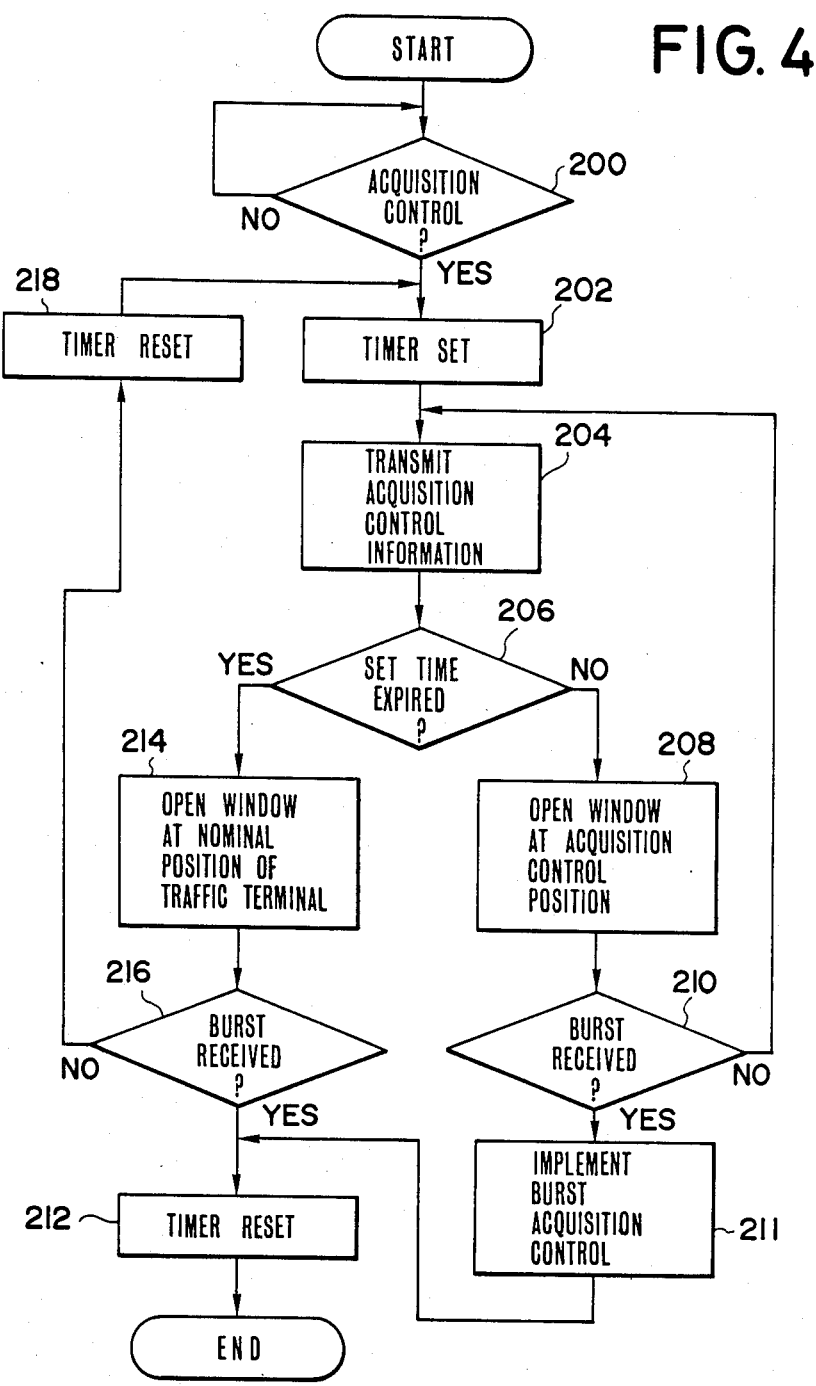

FIG. 4 shows a second embodiment of this invention.

When one of the reference stations intends to control a traffic terminal(s), the acquisition control is initiated (Step 200). Subsequently, a timer is set counting over a predetermined time interval (Step 202), and the traffic terminal controller 29 (FIG. 2) instructs the transmit burst generator 40 to emit the acquisition control information (Step 204). At Step 206, the timer is checked to determine whether the set time has expired or not. If the set time has not expired, then the program goes to Step 208 wherein the acquisition window opens to detect the burst therein (Step 210). How the acquisition window is opened has been described in connection with FIG. 3. If the burst is not detected at Step 210, the program goes back to Step 204. Otherwise (viz., in the case of the burst detection), the acquisition control is carried out at Step 211. Since the operations at Step 211 are identical to those executed at Step 106, further description will be omitted for simplicity. Thereafter, the program goes to Step 212 wherein the timer is reset (Step 212) after which the acquisition control is completely terminated.

If the set time has expired (Step 206), then the program goes to Step 214 wherein the synchronization window opens at the nominal position of the traffic terminal. The manner of opening this window has been described in connection with FIG. 3, so the description thereof will not be given. At Step 216, a check is performed to determine if the burst is detected within the synchronization window. If the burst is not detected at Step 216, then the program goes back to Step 202 after resetting the timer at Step 218. On the contrary, if the burst is detected at Step 216, the acquisition control is omitted, and the timer is reset at Step 212.

The foregoing description shows only preferred embodiments of the present invention. Various modifications are apparent to those skilled in the art without departing from the scope of the present invention which is only limited by the appended claims. For example, this invention can be applied to the redundant (duplexed) system of the reference station.

What is claimed is:

1. A method of implementing burst acquisition control of reference stations over at least one traffic terminal in the Time Division Multiple Access system, comprising the steps of:
    (a) allowing the reference station to open a synchronization window at the nominal position of the traffic terminal;
    (b) checking to determine if a burst transmitted from the traffic terminal is detected within said synchronization window;
    (c) omitting the burst acquisition control if the burst is detected within said synchronization window; and
    (d) implementing the burst acquisition control in the event that the burst is not detected within said synchronization window.

2. A method as claimed in claim 1, wherein said burst acquisition control includes the steps of:
    (a) allowing the reference station to open an acquisition window at an acquisition control position, and allowing the reference station to transmit acquisition control information to the traffic terminal, the traffic terminal transmitting the burst in response to said acquisition control information; and
    (b) detecting the burst within said acquisition window, controlling the traffic terminal to transmit the burst at the nominal position of said traffic terminal, allowing the reference station to open the synchronization window, and terminating the burst acquisition control when the burst transmitted from said traffic terminal is detected within said synchronization window.

3. A method of implementing burst acquisition control of reference stations over at least one traffic terminal in time division multiple access system, comprising the steps of:
    (a) setting a timer counting over a predetermined time period;
    (b) allowing the reference station to transmit acquisition control information to the traffic terminal, the traffic terminal transmitting a burst in response to said acquisition control information;
    (c) checking to determine if the predetermined time period has expired;
    (d) in the event that the predetermined time period has not expired, allowing the reference station to open an acquisition window at an acquisition control position, and checking to determine if a first burst is detected within said acquisition window;
    (e) in the event that said first burst is not detected within said acquisition window, going back to step (b), and in the event that said first burst is detected allowing the reference station to implement the burst acquisition control;
    (f) in the event that the predetermined time period has expired, allowing the reference terminal to open a synchronization window at the nominal position of the traffic terminal;
    (g) checking to determine if a second burst is detected within the synchronization window;
    (h) in the event that said second burst is detected within the synchronization window, omitting the burst acquisition control; and
    (i) in the event that said second burst is not detected, going back to step (a) after resetting the timer.

4. A method as claimed in claim 3, wherein the burst acquisition control includes the steps of:
    (a) allowing the reference station to open an acquisition window at an acquisition control position, and allowing the reference station to transmit acquisition control information to the traffic terminal, the traffic terminal transmitting the burst in response to said acquisition control information; and
    (b) detecting the burst within said acquisition window, controlling the traffic terminal to transmit the burst at the nominal position of said traffic terminal, allowing the reference station to open the synchronization window, and terminating the burst acquisition control when the burst transmitted from said traffic terminal is detected within said synchronization window.

* * * * *